United States Patent [19]

Fritz

[11] 3,917,339
[45] Nov. 4, 1975

[54] IMPACT ENERGY ABSORBING SYSTEM FOR A ROW OF VEHICLE SEATS

[76] Inventor: Fred W. Fritz, 1485 S. Vrain Way, Denver, Colo. 80219

[22] Filed: June 17, 1974

[21] Appl. No.: 480,121

[52] U.S. Cl.............. 296/65 A; 267/34; 267/131; 267/136; 296/35 B; 297/216
[51] Int. Cl.² ............................................ B60N 1/08
[58] Field of Search ........ 296/65 R, 65 A, 66, 35 B; 297/216; 267/113, 69, 136, 131, 166, 34, 93, 85, 70, 168; 308/6 R; 248/399, 400, 424, 429, 430

[56] References Cited
UNITED STATES PATENTS

| | | | |
|---|---|---|---|
| 986,723 | 3/1911 | King | 267/93 |
| 1,306,498 | 6/1919 | Moses | 296/65 R |
| 2,959,446 | 11/1960 | Thompson | 296/65 A |
| 2,993,732 | 7/1961 | Walker | 297/216 |
| 3,357,736 | 12/1967 | McCarthy | 296/65 A |
| 3,476,434 | 11/1969 | Coyle | 296/65 R |
| 3,847,452 | 11/1974 | Harder | 308/6 R |

FOREIGN PATENTS OR APPLICATIONS

| 742,189 | 3/1933 | France | 267/34 |
|---|---|---|---|

*Primary Examiner*—Robert J. Spar
*Assistant Examiner*—Gary Auton
*Attorney, Agent, or Firm*—Richard D. Law

[57] ABSTRACT

An energy absorbing system for cushioning a row of interconnected passenger seats within a vehicle upon the application of an impact force to the vehicle. The system comprising a plurality of vehicle seats arranged in tandem and mounted on a guideway means for slidable movement longitudinally within the vehicle and a spring operated, energy absorbing device mounted within the vehicle and attached to the seat row. The guideway means includes a pair of parallel guide rails upon which the row of seats are mounted with the guide rails positioned flush with the floor of the vehicle or below the floor. The energy absorbing device connected directly to the row of seats is fixedly attached to the vehicle and includes a plurality of compression springs and a thrust plate mounted within a boxlike receptacle. The springs, having different lengths and/or spring constants, are mounted on each side of the thrust plate means to attentuate the movement of the seats in either a fore or aft direction with respect to said vehicle. A rebound dampener assembly is mounted on said receptacle in conjunction with the thrust plate means to allow the seats to move in the opposite direction upon impact and restrict movement in the opposite direction to prevent sudden rebound.

6 Claims, 8 Drawing Figures

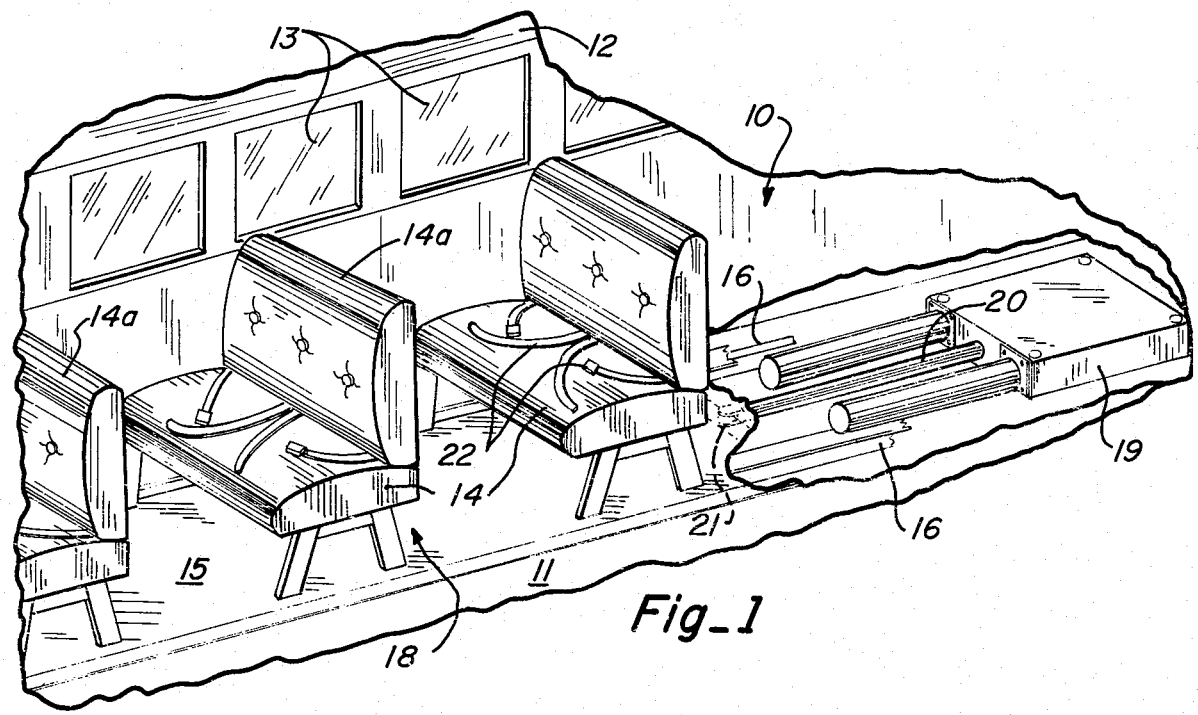
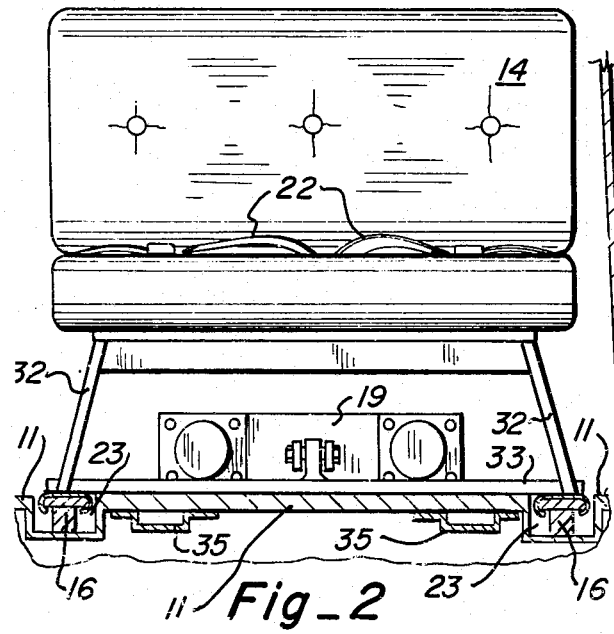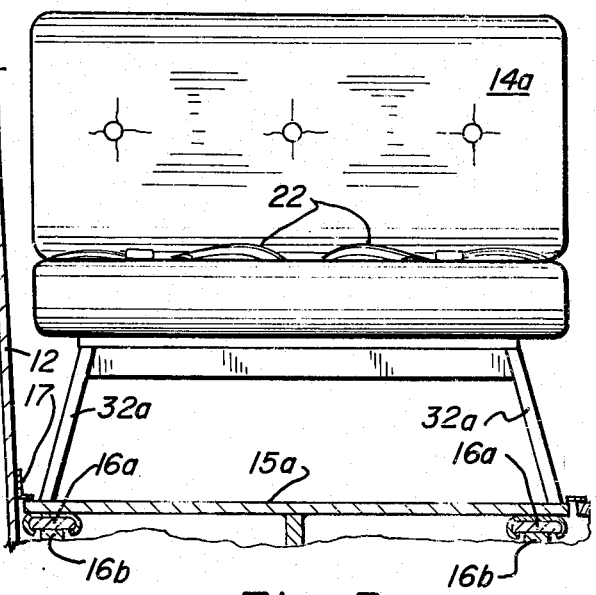
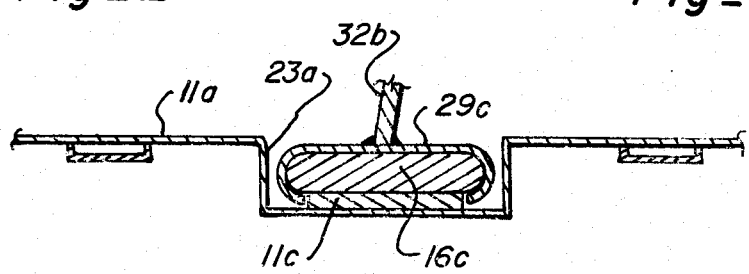

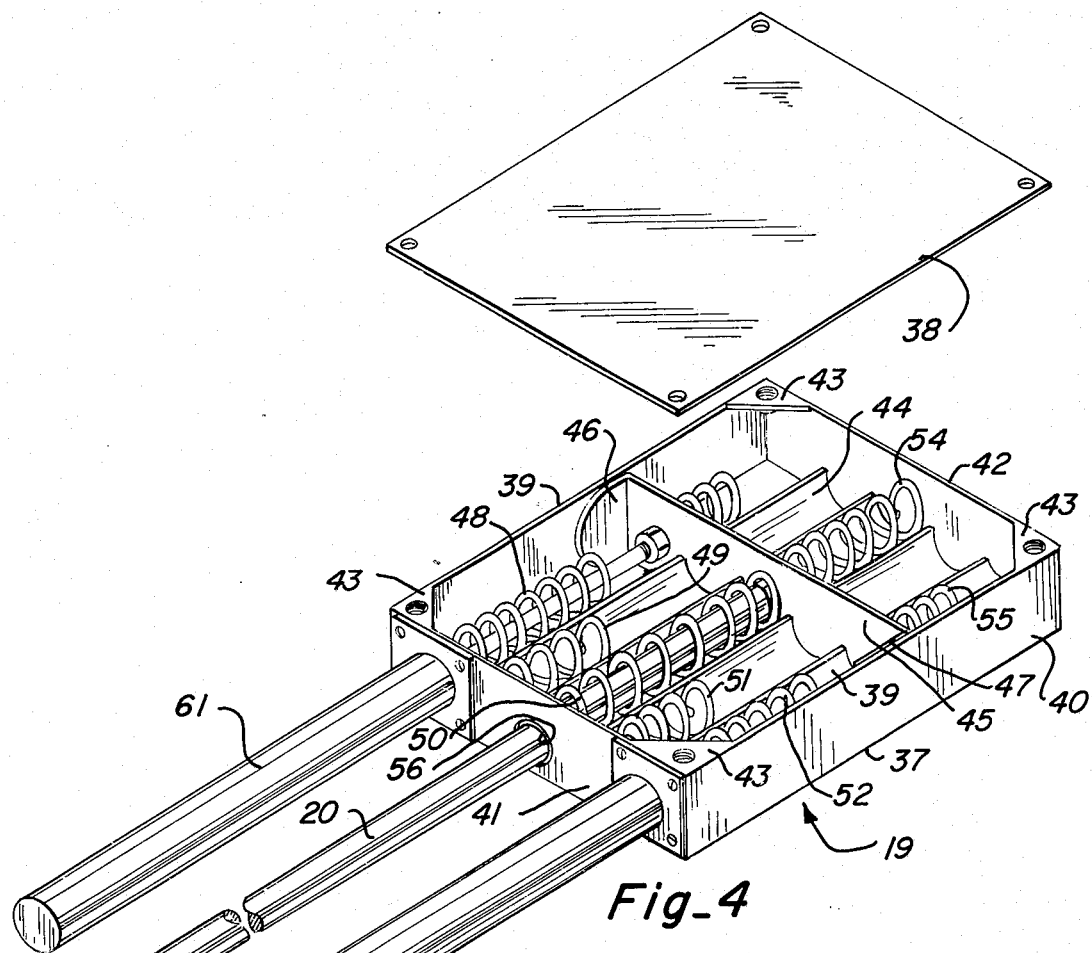
Fig_4
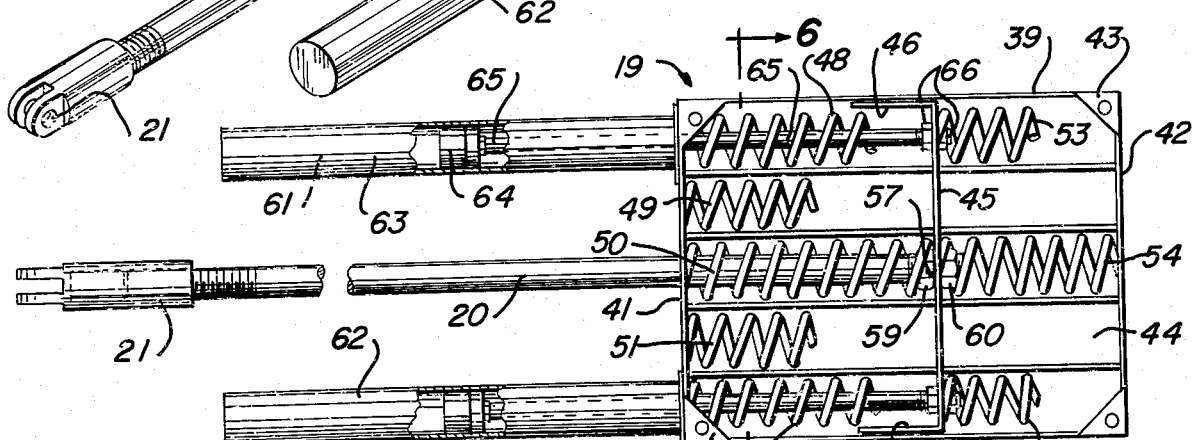
Fig_5
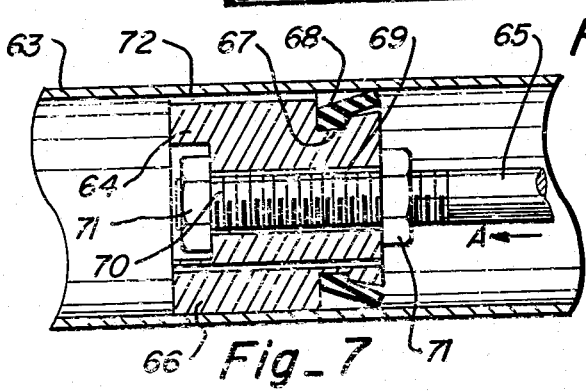
Fig_7
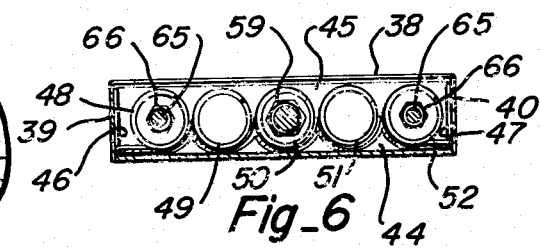
Fig_6

IMPACT ENERGY ABSORBING SYSTEM FOR A ROW OF VEHICLE SEATS

REFERENCE TO DISCLOSURE DOCUMENT

The subject matter herein is in Disclosure Document No. 027662, dated Jan. 18, 1974, and filed in the Patent Office Jan. 21, 1974.

BACKGROUND OF THE INVENTION

The present invention is directed to an energy absorbing system for cushioning a row of interconnected seats within a vehicle upon application of an impact force to said vehicle. It is more specifically directed to a system whereby the row of seats is arranged as a slidable unit within the vehicle with a spring type variable energy absorbing device attached thereto for cushioning the movement of the seats.

As is well known in the prior art there are many devices that have been proposed for cushioning the movement of seats within a vehicle to reduce injuries to passengers when the vehicle is involved in an accident. Most of these devices are directed to use within an automobile where only one or two seats are arranged for absorbing shock. In most of these devices the seats are mounted on some type of guide rail arrangement usually with the seats mounted on rollers and the rollers disposed to move within a channel member.

In the safety apparatus shown in U.S. Pat. No. 2,993,732 to W. M. Walker, a row of seats is shown to be mounted on an elevated platform which is arranged to slidably move within a pair of parallel upturned guide rails. A plurality of rods mounted under and attached to the seats are positioned in conjunction with a pair of hydraulic cylinders mounted at each end of the rods. The Walker arrangement allows the seats to move only in the forward direction as shown by the positioning of the pistons. In addition, this apparatus does not provide a means for variably controlling and increasing the energy absorption in relation to the distance the seat row moves during an impact.

The other devices known in the prior art use similar type arrangements with some using a single spring mounted in each guide rail for cushioning the seat movement in a particular direction. Another arrangement shows a seat mounted on rollers positioned in a guide channel with an elastic cord used to provide the shock isolation for energy absorption. A spring loaded cam is used in this device to lock the seat in the extended position to prevent rebound.

As can be seen, nowhere in the prior art is there any device directed to an arrangement whereby the energy absorption is variably increased in relation to the amount of impact applied to the vehicle during the accident.

Objects of the Invention

In view of the above discussion of the devices available in the prior art, it is an object of the present invention to provide an energy absorbing system for isolating a row of seats within a vehicle to prevent or reduce injuries to passengers if the vehicle is involved in an accident.

Another object of the present invention is to provide a shock absorbing device which incorporates a plurality of compression springs to variably absorb the energy transmitted to a row of seats in either a fore or aft direction whereby the energy absorption is increased in direct proportion to the total impact on the vehicle.

A further object of the present invention is to provide a shock absorbing arrangement for vehicle seats wherein the energy absorbing device has a rebound restricter connected to said seats so that after the seats are moved by impact to their maximum travel in either direction they will be prevented from rebounding to their original position which may cause injury to the passengers.

A still further object of the present invention is to provide a low cost, easily manufactured energy absorbing system which can be easily adapted for use with any type vehicle to protect and prevent injury to the passengers.

SUMMARY OF THE INVENTION

This invention relates to an energy absorbing system which has the characteristics of utilizing compression springs to provide a variable rate of energy absorption so as to essentially isolate a row of vehicle seats from the remainder of the vehicle during an accident with a generally longitudinal impact. This is to say that when an impact force is applied to either the front or rear end of the vehicle the movement energy of the passengers will be substantially absorbed in the system rather than being applied to the passengers seated within the vehicle.

The present invention can be utilized in any type of vehicle such as aircraft, trains, buses, especially school buses, passenger cars, and any type of land, sea or air vehicle wherein a number of passengers are carried. The seats of the vehicle, which are arranged in tandem, form rows mounted on slidable guide rails positioned below the seats.

The guide rails are arranged so that the upper portion is a slidable section while the lower portion is anchored firmly to the body and/or framework of the vehicle. The slidable or upper portion of the guide rails have their longitudinal edges rolled down and under the side flanges of the stationary rails to permanently lock the rails together yet allowing the slidable movement. This arrangement shields or restricts the entrance of dirt and debris into the guide rails which could possibly interfere or restrict the movement between the parts. If desired, various bearing arrangements can be provided between the guide rail sections such as a self-lubricating coating, i.e., Teflon, which can be disposed between the guide rail members coincident with their normal contacting surfaces. Another arrangement which would permit easy slidable movement between the parts would be the inclusion of ball or roller bearings arranged in grooves extending longitudinally along the rails. The greater the reduction in the coefficient of friction between the rail members, the better will be the seat isolation from the vehicle during impact to reduce passenger injury.

The guide rails are arranged in parallel fashion below the seats in longitudinal slots with the upper slidable portion arranged flush with the upper surface of the floor. In this embodiment, the seats are mounted directly on the guide rails permitting the floor to be flat and unobstructed. In another embodiment, the floor below the seat area can be arranged as a separate rectangular section with the seats mounted on the floor section and the floor section in turn mounted on top of the guide rails previously mentioned. If desired a seal or flap can be positioned over the joint between the floor sections to prevent objects from becoming wedged between the floor portions.

An energy absorbing device having a box-like receptacle is mounted securely to the body and/or framework of the vehicle and is connected to the slidable row of seats by means of a connecting rod and thrust plate positioned within the receptacle. A plurality of compression springs are arranged within the receptacle on each side of the thrust plate to attenuate and absorb energy transferred from the receptacle to the transfer plate during a collision.

An important feature of the present invention is the use of springs on each side of the thrust plate so that energy can be absorbed in either of the fore or aft longitudinal directions. In addition, the springs are arranged with various lengths and possibly even increased spring constants in the shorter springs. Thus, when an impact is applied to the vehicle, the seat row will be allowed to move with respect to the vehicle a distance variably proportioned to the total energy applied. Thus, under a severe impact the seats and thrust plate will move with respect to the receptacle causing the longest springs to compress first until contacting the next longer springs to sequentially increase the movement restriction until the entire energy is absorbed in the plurality of springs provided.

A rebound dampening assembly is provided in combination with the energy absorbing device of the system whereby once the seats and thrust plate have accomplished their maximum travel the seats will be damped from this position to the original position to prevent the seats from rebounding to their original position. The dampener assembly includes a pair of closed air cylinders with a piston mounted in each cylinder and attached to the thrust plate. The air piston can be easily compressed by the movement of the thrust plate with reverse air movement restricted to prevent the piston from moving rapidly in the opposite direction. A small bleed orifice is provided through the piston to allow the air pressure to bleed down slowly so that the seats can return to their original position.

BRIEF DESCRIPTION OF THE DRAWINGS

Other features of this invention will appear in the following description and appended claims, reference being made to the accompanying drawings forming a part of the specification wherein like reference characters designate corresponding parts in the several views.

FIG. 1 is a pictorial perspective view of the inside of a vehicle showing a row of seats mounted and isolated from the vehicle by means of the energy absorbing system of the present invention;

FIG. 2 is a sectional view showing one embodiment wherein the seats are mounted directly to a pair of guide rails;

FIG. 3 is a sectional view of a track and its mounting in a vehicle floor;

FIG. 4 is a pictorial perspective view of the energy absorbing device according to the present invention showing the cover raised to reveal the compression springs and thrust plate positioned within the receptacle;

FIG. 5 is a top plan view of the energy absorbing device of the present invention showing the springs cut away to reveal the connections of the thrust plate with the seat connecting rod and the rebound assembly;

FIG. 6 is a cross sectional view of the energy absorbing device taken along the lines 6—6 of FIG. 5;

FIG. 7 is an enlarged partial sectional view of the rebound assembly shown in FIG. 5; and FIG. 8 is an enlarged sectional view of a guide rail with the seat mounted on the upper slidable section of the guide rail.

DETAILED DESCRIPTION OF THE EMBODIMENTS

Turning now more specifically to the drawings, FIG. 1 shows the interior of a typical vehicle 10 such as a bus, railroad passenger car, or passenger type aircraft, having floor 11, sidewalls 12 having windows 13 and seats 14 for accommodating passengers. As is common in this type of vehicle the seats 14 are arranged in tandem to form a row 18.

The seats as shown in the embodiment of FIG. 1 are mounted on a rectangular section of floor 15 which in turn is mounted on a pair of guide rails 16. Edging strips 17 can be provided over the joint between the section 15, floor 11 and the wall 12. The strip 17 is intended to prevent dirt and debris from falling below the floor surface and also to cover the space between the sections to prevent a person from tripping or catching their shoe in the joint between the floor sections.

An energy absorbing device 19 having a connecting rod 20 is rigidly mounted to the body and/or frame of the vehicle 10 at a point usually at the rear of the row of seats 18. A threaded clevice connection 21, for adjustment, provided at the end of connecting rod 20 is attached to the row of seats 18 by means of a pin or bolt. The rod attachment to the seat row, and the alignment of the connecting rod 20 and energy absorbing device 19 is intended to be arranged along the longitudinal axis of the seat row 18 to essentially balance and evenly distribute the forces transmitted to the seat row 18 and guide rails 16. Rebound dampener cylinders 22 are provided as part of the energy absorbing device 19 and will be described later. In addition, the energy absorbing device is arranged so that movements of the seat row 18 in either the fore or aft direction will be attenuated by the device. A more detailed description of the device will follow below.

The energy absorbing system according to the present invention is provided to essentially isolate the seats 14 of the seat row 18 from the structure of the vehicle 10. If desired, seat belts 22 can be provided to restrain the passengers in the seats to prevent their being thrown around within the vehicle and possibly injured. It is, also, intended that the rear portion of the back of each seat 14 will be heavily cushioned to protect any passengers who are not using a seat belt and are thrown forward against the seat in front of the passenger. In this arrangement, the passengers will be essentially restrained and/or cushioned within the seat row itself. It is to be understood that the energy absorbing device 19 does not necessarily have to be mounted at the rear of the seat row 18 but can be mounted at the forward end of the row or at any point intermediate of the row as desired, depending upon the design of the vehicle.

The seats 14 arranged to form the row 18 can either be mounted on the guide rails 16 directly as shown in FIG. 2 or can be mounted on a separate section of floor 15 which in turn is mounted on the guide rails 16 as shown in FIGS. 1 and 3. As shown in the embodiment of FIG. 2, the floor 11 which is suitably supported within the framework of the vehicle 10 includes parallel longitudinal slots 23 extending the length of the seat row 18. The guide rails 16 are positioned conveniently in these slots 23 and extend the length of the slots 18. The individual guide rails have a lower stationary section 24 and an upper slidable section 25. The stationary section 24 has outwardly extending sides or shoulders which extend the full length of the stationary section 24. The upper slidable section 25 has outer edges 28, 29 rolled downwardly and under the flanges 26, 27, respectively, to securely couple these sections together. In this way, the two sections 24, 25 cannot be removed from each other, yet are capable of slidable movement with respect to each other in a longitudinal direction. The stationary section 24 of the guide rails 16 is mounted on suitable supports, such as I-beams 30 which form a part of the framework of the vehicle 10, or on floor sections, etc. and are suitably positioned to support the guide rails 16 and maintain them in their proper position.

In FIG. 3, a seat 14a mounted on legs 32a, is affixed to slides or rails 28a, which are mounted in a vehicle floor 35a. The floor includes reinforcing 35b for strength. A spacer 16b supports track portion 16a. The track affixed to the floor strengthens the same.

Instead of having metal-to-metal contact between the stationary section 24 and slidable section 25, a coating or layer of self-lubricating material 31, such as Teflon, can be included to cover the surfaces of contact between the two elements. It is also possible that the upper slidable section 25 and the lower stationary section 24 can have longitudinal grooves formed in their mating surfaces (not shown) with balls or rollers positioned within the grooves to reduce the sliding friction between the elements. In this way the seats 14 within the rows 18 can be substantially isolated from the sudden movements of the vehicle.

It should be noted that the configuration of the guide rails 16 is an important feature of the present invention. The arrangement of the slidable section 25 of the guide rail 16 in an upper or covering position over the stationary portion 24 is intended to prevent dirt and debris present on the floor of the vehicle from being allowed to enter the contacting surfaces between the sections. Thus the rolled edges 28, 29 of the slidable section 25 substantially covers and seals the sliding surface and maintains it in a relatively clean condition to maintain the reduced friction between the sections.

In the embodiment shown in FIG. 2, the seat 14 is shown with legs 32 mounted directly to the upper surface of the slidable guide rail section 25. In turn, the upper surface of the guide rail 25 is mounted flush with the upper surface of the vehicle floor 11. In this way there are no obstructions or protuberances above the floor surface which may interfere with the ingress or egress of passengers.

A connecting bar 33 is permanently attached to the upper surface of both of the slidable guide rail sections 25 and arranged to interconnect these guide rails along with seats to form a single slidable unit. The energy absorbing device 19 is connected to the transverse connecting bar 33 by means of the connecting rod 20. In this way the movement of the seat row 18 is effectively controlled and attenuated by the energy absorbing device 19 and connecting rod 20.

In another embodiment of the energy absorbing system according to this invention as shown in FIGS. 1 and 3, the longitudinal guide rails 16 having the upper slidable section 25 and lower stationary section 24 are mounted so that the lower section 24 is positioned on blocks or spacers 34 which are mounted on the framework 35 of the vehicle 10; the seats 14 are mounted with the legs 32 securely affixed to the upper surface of the separate floor section 15. The floor section 15 is then mounted on the upper surface of the slidable section 25 of the guide rails 16 so that the floor section 15 spans the area between the guide rails 16. The elevation of the floor section 15, as stated previously, is arranged flush with the remaining floor surface 11 of the vehicle to eliminate any obstructions. The energy absorbing device 19 is mounted below the floor section 15, under the rear seat, or the like, and is rigidly attached to the body and/or framework 35 of the vehicle 10. Thus, the energy absorbing device is completely above the floor surface of the vehicle. The connecting rod 20 is connected by means of the clevice 21 to an attaching post 36 mounted to the underside of the floor section 15.

The energy absorbing device 19 of the present invention, as shown in FIGS. 4, 5 and 6, includes a box-like receptacle 37 having a cover plate 38. The receptacle 37 includes sides 39, 40 and ends 41, 42. The upper corners of the box 37 include threaded gusset tabs 43 for securing the cover 38 to the box 37 by means of bolts.

A plurality of parallel channels or recesses 44 having a hemispherical or curved cross section are arranged within the receptacle 37 and parallel to the longitudinal axis of the device 19. A thrust plate 45 is positioned transversely across the receptacle 37 and includes scallops along the bottom edge to correspond with the configuration of the bottom recesses 44. The ends 46, 47 of the thrust plate 45 are bent at right angles to the plate 45 so that the thrust plate fits within the inside dimension of the receptacle between the sides 39 and 40. In this way, the thrust plate 45 is guided so that it will easily slide in a longitudinal direction within the receptacle 37.

A plurality of springs 48, 49, 50, 51 and 52 are arranged on one side of the thrust plate 45 and additional springs 53, 54, 55 are positioned on the opposite side of the thrust plate 45. These springs are of the compression type and are designed to have an outside diameter which substantially conforms with the configuration of the receptacle recesses 44. The number and size of the springs are determined by the number of seats and the size of vehicle. Although it is not absolutely necessary, it is preferred that the springs be of an odd number so that corresponding springs 50 and 54, one positioned on each side of the thrust plate 45, will be coaxial to the central longitudinal axis of the receptacle 37. The heavy section connecting rod 20 passes through an aperture 56 provided in the end 41, the spring 50 and an aperture 57 centrally provided in the thrust plate 45. The end of the connecting rod 20 at the thrust plate is secured to the thrust plate as by welding or the like, or by means of a pair of threaded nuts 59, 60 on either side of the plate 45. By loosening the nuts 59, 60 the position of the seat row 18 with respect to the thrust plate 45 can be adjusted as required, as is the case with the clevis 21 threaded to the rod 20. In this fashion, the neutral position of the seat row 18 can be adjusted with respect to the energy absorbing device 19 and the framework of the vehicle 10 to properly position the seats to allow sufficient distance of movement in either the fore or aft direction within the vehicle.

As shown in FIG. 4, the thrust plate 45 is positioned within the receptacle closer to the end 42 than the end 41 with the distance between the thrust plate and the end 42 being approximately one-third to possibly two-fifths of the overall length of the receptacle 37. The springs on the left side of the thrust plate as viewed in FIG. 4 are thus intended to attenuate the movement of the seats in the forward direction upon a frontal impact while the springs on the right side are intended to attenuate the movement of the seat in the rear direction upon a rear impact. It is anticipated that greater forces will be applied in a front or head-on impact and for this reason the springs on the forward side of the thrust plate would be expected to be required to absorb a greater amount of energy during impact. The length of the springs 50 and 54 is designed to be slightly longer than the distance between the thrust plate 45 and the respective ends 41, 42 to hold the thrust plate 45 in a neutral position to prevent end play or movement of the seat row during normal operation of the vehicle.

An additional feature of the present invention is the use of springs having different lengths and/or spring constants so that the energy absorbed by the movement of the thrust plate against the springs will be variably increased the further that the seats and thrust plate move in a forward or aft direction. Thus, springs 48 and 52 are shorter than spring 50 and springs 49, 51 are even shorter in length than springs 48, 52. In a like fashion, springs 53, 55 on the opposite side of the thrust plate are shorter than spring 54.

As can be easily seen, during a head-on collision of the vehicle the seats and thrust plate will be moved toward the left as seen in FIG. 4, with the distance that the thrust plate is moved depending upon the impact force applied. The impact energy will be absorbed by spring 50 for a short distance until the thrust plate contacts springs 48 and 52 whereby additional energy will be absorbed with further movement eventually causing the thrust plate to contact the springs 49 and 51 with its greater energy absorption and retardation of movement. This same situation applies in the reverse direction where a rear impact causes the thrust plate to move towards the right where the energy will be absorbed by spring 54 and subsequently springs 53 and 55. It is to be understood that the springs can be varied in length as desired with the shorter springs possibly having an increased spring constant to further absorb the energy applied. It is intended that the length of the springs and the spring constants will be coordinated so that a smooth retardation of the movement of the thrust plate and consequently the seat row 18 can be effected.

In order to prevent the seats and thrust plate from being automatically and sometimes violently returned to their neutral position, a pair of rebound dampening devices 61, 62 is incorporated in the shock absorbing device 19. Although a pair of dampening devices is shown, it is to be understood that any number of dampeners can be provided as desired. For convenience in describing the dampeners, the following explanation will be directed to one of the dampeners while it is understood that the structure of the dampeners is identical. The dampener 61 includes an enclosed air cylinder 63 as attached to the end 41 of the receptacle 37 by any suitable means such as rivets, bolts or the like. A piston 64 is slidably positioned within the cylinder 63 and is connected to the thrust plate 45 by means of a rod 65. The length of the cylinders 63 is provided to be slightly greater than the length of the receptacle 37 with the length of the rod 65 arranged to position the piston 64 within the cylinder 63 to generally correspond with the location of the thrust plate 45 with the receptacle 37. Thus, the movement of the piston 64 can freely follow the movement of the thrust plate 45 without restricting the travel of the thrust plate 45. The cylinder 63 is completely filled with air and a suitable seal is provided at the end of the cylinder to allow movement of the rod 65 without loss of the air.

The piston 64 includes a body 66 having a cifcumferential groove 67 and seal 68 positioned therein. The body 66 also includes a central opening 69 with the end 70 of the rod 65 passing therethrough and attached by means of nuts 71. Relatively large longitudinal grooves are provided around the outer perimeter of the piston body 66 to permit the air on one side of the piston to flow freely to the opposite side when the rod 65 and piston 64 are moved in a direction as shown by arrow A. Once the piston 64 has reached its maximum travel, the air within the cylinder 63 on the back side of the piston forces the seal 68 tight against the cylinder to trap the air and compress the same as the piston 64 and rod 65 return toward neutral or original position. The rod 65 thus holds the thrust plate 45 and seat row 18 in the extended position against the spring compression force to prevent rebound of the seats. A bleed orifice 63 allows the air under pressure on the back side of the piston to slowly bleed to the opposite side allowing the piston and consequently the seats to slowly return to their original position.

The pair of dampeners 61, 62 are provided to balance the restraining forces on the thrust plate 45, but it is to be understood that any number of dampeners may be provided such as a single air cylinder dampener provided around the connecting rod 20. In this arrangement, the piston would be rigidly secured to the rod 20 within a cylinder and operate substantially as described above.

The present arrangement effectively reduces the rebound of the seats caused by an impact at the forward end of the vehicle. The bleed orifice 63 provided in piston 66 can effective operate in either direction.

An edge view of a sliding track arrangement is illustrated in FIG. 8, wherein a metal floor 11a includes a pair of grooves 23a (only one being shown). A spacer 11c is mounted in groove and stationary track member 16c is mounted thereon. A movable track member 29c is slidably mounted on the stationary track member, and is secured on the stationary member by the rolled under edges. This, also, keeps dirt from the track. The seats are mounted on the sliding track as by legs 32b welded or otherwise secured to the sliding track. Of course, the track may take other configurations, as square, rectangular, etc., as well as the oblong track shown.

In some instances, it may be desirable to connect the slot support with the energy absorbing system with a cable and pulley arrangement instead of the direct connection of the shaft. This permits latitude in design in adapting the unit to various vehicles. Further, the rebound dampener devices may be incorporated in the energy absorption housing, to reduce the overall length of the unit, by securing the same to the thrust plate independently of the springs.

While an energy absorbing system for vehicle seats has been shown and described in detail, it is obvious that this invention is not to be considered as limited to the exact form disclosed and that changes in detail and construction may be made therein within the scope of the invention without departing from the spirit thereof.

What is claimed is:

1. An energy absorbing system for controlling the deceleration movement of a longitudinal row of interconnected seats in a vehicle should the vehicle be subjected to a longitudinal impact force wherein said row of seats is mounted on slidable guide means arranged so that the seats will slide, longitudinally, in a fore and aft direction with respect to said vehicle and an energy absorbing means having a fixed component mounted on the vehicle and a movable component attached to said row of seats to attenuate any movement of said row of seats resulting from a sudden acceleration movement of the vehicle as when the vehicle is subjected to an impact so as to cushion the impact force transferred to passengers occupying said seats, the improvement comprising in the combination set forth:
    a. a plurality of compression springs between the fixed component and the movable component of the energy absorbing device, with at least one spring having a length such as to resist any movement between the said components and at least one shorter spring having a length such as to resist movement between the components only after the first mentioned component has been compressed to a substantial degree by movement between the two components whereby to increase the resistance to further movement between the components to a degree exceeding the resistance by continued compression of the first mentioned spring; and
    b. damper means to attenuate the rebound effect of the compressed springs after the impact force terminates; said slidable guide means includes a pair of parallel guide rails which are arranged parallel to the longitudinal axis of the vehicle, each of said guide rails includes a stationary section fixedly attached to said vehicle and a slidable section upon which said row of seats are mounted, the slidable portion of said guide rails being positioned above the stationary portion and having longitudinal side edges turn downward and under the edges of said stationary sections to maintain the relative position of the sections and prevent dirt and debris from entering the area between said sections which could retard the slidable movement of said seats.

2. An energy absorbing system as defined in claim 1 wherein
    said guide rails include a bearing means disposed between said stationary and slidable sections to reduce the sliding friction so that said row of seats can easily move with respect to said vehicle upon application of said impact force.

3. An energy absorbing system as defined in claim 2 wherein
    said bearing means is a self lubricating material disposed between said stationary and sliding sections of said guide rails.

4. An energy absorbing system as defined in claim 1 wherein
    the guide rails of said system are positioned in parallel slots formed in the floor of said vehicle, the upper surface of said slidable section of each of said guide rails being arranged flush with the surface of said floor with the seats of said row being mounted directly on said slidable sections whereby the floor area below the seats is flat with no raised obstructions.

5. An energy absorbing system as defined in claim 1 wherein:
    the floor of said vehicle below said row of seats is arranged as a separate movable section, the seats of said row being mounted directly to said separate floor section and said guide rails and shock absorbing means are mounted below said separate floor section, said separate floor section being mounted on the upper surface of said guide rails to allow the floor section and the seats attached thereto to slidably move upon application of the impact force on said vehicle.

6. In the organization defined in claim 1 wherein said damper means comprises:
    an air cylinder between the fixed component and the movable component having a bypass passageway in the piston thereof to permit a flow of air from one side to the other as shock absorbing movements of the seats occur with respect to the vehicle.

* * * * *